United States Patent
Shirotori et al.

(10) Patent No.: US 12,265,276 B2
(45) Date of Patent: Apr. 1, 2025

(54) LENS UNIT FOR PREVENTING LENS SURFACE BEING CLOUDED

(71) Applicant: NIDEC SANKYO CORPORATION, Nagano (JP)

(72) Inventors: Toshio Shirotori, Nagano (JP); Akinori Yamamoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 638 days.

(21) Appl. No.: 17/535,687

(22) Filed: Nov. 26, 2021

(65) Prior Publication Data
US 2022/0171152 A1     Jun. 2, 2022

(30) Foreign Application Priority Data

Nov. 27, 2020   (JP) ................................. 2020-196622

(51) Int. Cl.
*G02B 7/02*     (2021.01)
*G02B 5/00*     (2006.01)
*G02B 13/18*    (2006.01)

(52) U.S. Cl.
CPC ............. *G02B 7/021* (2013.01); *G02B 5/003* (2013.01); *G02B 13/18* (2013.01)

(58) Field of Classification Search
CPC ........ G02B 7/021; G02B 5/003; G02B 13/18; G02B 27/0006; G02B 7/02
See application file for complete search history.

(56) References Cited

U.S. PATENT DOCUMENTS

| | | | | |
|---|---|---|---|---|
| 2009/0225455 A1* | 9/2009 | Kawasaki | ............... | G02B 13/04 359/830 |
| 2009/0245767 A1* | 10/2009 | Sakai | ..................... | G02B 7/021 396/25 |
| 2010/0027135 A1* | 2/2010 | Sodeyama | ............ | G02B 7/021 359/740 |
| 2013/0002938 A1* | 1/2013 | Kim | ......................... | G02B 9/04 359/356 |
| 2018/0172986 A1* | 6/2018 | Manushi | ................ | G02B 7/021 |
| 2019/0137850 A1* | 5/2019 | Ha | .......................... | G02B 7/028 |

(Continued)

FOREIGN PATENT DOCUMENTS

| JP | 2005128362 | 5/2005 |
|---|---|---|
| JP | 2006349752 | 12/2006 |

(Continued)

OTHER PUBLICATIONS

"Office Action of China Counterpart Application", issued on Jun. 10, 2023, with English translation thereof, pp. 1-22.

*Primary Examiner* — Bao-Luan Q Le
(74) *Attorney, Agent, or Firm* — JCIPRNET (57) ABSTRACT

A lens unit includes a first lens disposed on an object side in an optical axis direction, a plurality of image-side lenses (second lens through seventh lens) comprising a second lens facing the first lens on an image side in the optical axis direction and disposed on the image side with respect to the first lens, a lens barrel coaxial with the optical axis to hold the first lens and the plurality of image-side lenses radially inside, a first sealing member to seal a gap between the first lens and the lens barrel, and a second sealing member to seal a gap between an image side surface (flange surface) of the first lens and the lens barrel radially inside the first sealing member.

11 Claims, 9 Drawing Sheets

(56) References Cited

U.S. PATENT DOCUMENTS

| | | | |
|---|---|---|---|
| 2019/0235193 A1* | 8/2019 | Komiyama | B29D 11/0073 |
| 2019/0250363 A1* | 8/2019 | Ha | H04N 23/55 |
| 2019/0310438 A1* | 10/2019 | Komiyama | G02B 7/02 |
| 2020/0041874 A1* | 2/2020 | Nakamura | G02B 7/022 |
| 2020/0049930 A1* | 2/2020 | Wei | G02B 7/021 |
| 2020/0049950 A1* | 2/2020 | Wei | H04N 23/55 |
| 2020/0081231 A1* | 3/2020 | Komiyama | G02B 13/16 |
| 2020/0301092 A1* | 9/2020 | Shirotori | H04N 23/55 |
| 2021/0018715 A1* | 1/2021 | Fujii | G02B 13/18 |
| 2021/0294066 A1* | 9/2021 | Hirata | H05B 1/0288 |
| 2022/0146777 A1 | 5/2022 | Inaba et al. | |
| 2022/0171151 A1* | 6/2022 | Kanzaki | G02B 7/008 |

FOREIGN PATENT DOCUMENTS

| | | | |
|---|---|---|---|
| JP | 2014106387 | | 6/2014 |
| JP | 2014223000 | | 11/2014 |
| JP | 2018054798 | | 4/2018 |
| JP | 2019060943 | | 4/2019 |
| JP | 2020144307 | | 9/2020 |
| JP | 2020144307 A | * | 9/2020 |
| WO | 2020175536 | | 9/2020 |

* cited by examiner

LENS UNIT FOR PREVENTING LENS SURFACE BEING CLOUDED

CROSS REFERENCE TO RELATED APPLICATION

The present invention claims priority under 35 U.S.C. § 119 to Japanese Application No. 2020-196622 filed Nov. 27, 2020, the entire content of which is incorporated herein by reference.

BACKGROUND

Field of the Invention

At least an embodiment of the present invention relates to a lens unit in which a plurality of lenses are held in a lens barrel.

Description of the Related Documents

Conventionally, an imaging device mounted in an automobile or a surveillance camera employs a lens unit in which a plurality of lenses are accommodated in a lens holder. In this lens unit, a lens surface of a first lens which is on the objectmost object side is exposed externally from the lens holder.

Such a lens unit is disclosed in Japanese Patent Laid-open Publication No. 2018-054798, for example. In the document, the first lens is accommodated in a lens holder made of resin. More specifically, a first lens-holding cylindrical portion of the lens holder surrounds the first lens from the outside thereof in a radial direction. The first lens has a small-diameter portion on the image side. An O-ring is disposed between an outer peripheral surface of the small-diameter portion and the first lens-holding cylindrical portion. Since the first lens is engaged with the first lens-holding cylinder by thermally caulking as well as the O-ring is disposed between the outer peripheral surface of the small-diameter portion of the first lens and the first lens-holding cylinder, an airtightness inside the lens unit is maintained at substantially constant level.

However, after a long-term usage of the lens unit, it is concerned that moisture passing through the O-ring would enters an interior of the lens holder. In addition, since the resin is capable of absorbing and releasing moisture, after a long-term usage of the lens unit, it is also concerned that the moisture passing through the lens holder would enter the interior the lens holder. In particular, the first lens-holding cylinder is likely to cause the moisture to pass through and enter the interior thereof. Therefore, if a temperature of an external environment becomes lower than that of the interior of the lens holder, the moisture having entered the interior of the lens holder would cause drew condensation on a lens surface on an image side of the first lens and cloud the lens surface, since the first lens is exposed to the external environment.

At least an embodiment of the present invention provides a lens unit capable of suppressing a first lens from being clouded.

SUMMARY

A lens unit according to at least an embodiment of the present invention includes: a first lens disposed on an object side in an optical axis direction; a plurality of image-side lenses comprising a second lens facing the first lens on an image side in the optical axis direction and disposed on the image side with respect to the first lens; a lens barrel to hold the first lens and the plurality of image-side lenses radially inside, an optical axis being at a center of a radius; a first sealing member to seal a gap between the first lens and the lens barrel; and a second sealing member to seal a gap between an image side surface of the first lens and the lens barrel radially inside the first sealing member.

At least an embodiment of the present invention includes a first sealing member to seal a gap between the first lens and the lens barrel, and a second sealing member to seal a gap between an image side surface of the first lens and the lens barrel radially inside the first sealing member. Accordingly, the first lens accommodated in the lens barrel is sealed with the first sealing member and the second sealing member, so that a high airtightness inside the lens barrel is ensured. Furthermore, even if moisture passes through the lens barrel, the moisture is hard to penetrate deep into the lens barrel since the second sealing member seals the gap between the image side surface of the first lens and the lens barrel. Therefore, even after a long-term usage of the lens unit, the moisture is hard to penetrate deep into the lens barrel, so that the lens surface on the image side of the first lens can be prevented from being clouded.

In the at least an embodiment of the present invention, it is preferable that the lens barrel includes a first communication path that connects a first space between the first sealing member and the second sealing member to an outside of the lens barrel. In accordance with this configuration, when the first lens is installed onto the lens barrel, air in the first space between the first sealing member and the second sealing member can be evacuated to the outside of the lens barrel, so that assembling the first lens to the lens barrel can be easy.

In the at least an embodiment of the present invention, it is preferred that the first communication path is sealed with a third sealing member. In accordance with this configuration, since the first communication path is sealed with the third sealing member after the first lens is mounted on the first housing portion, even when the first communication path is provided to evacuate air in the first space to the outside of the lens barrel, the airtightness inside the lens barrel can be enhanced.

In the at least an embodiment of the present invention, it is preferred that the lens unit includes a fourth sealing member that seals a gap between the second lens and the lens barrel radially inside the second sealing member. In accordance with this configuration, the airtightness between the second lens and the lens barrel is improved with the fourth sealing member, so that moisture from lenses after the second lens in the lens barrel can be prevented from entering between the first lens and the second lens. Therefore, it is possible to further suppress the lens surface on the image side of the first lens from being clouded.

In the at least an embodiment of the present invention, it is preferred that the lens barrel includes a caulking cover that covers an outer peripheral end of the second lens from the object side, and the fourth sealing member is disposed between the second lens and the caulking cover. This configuration makes it easy to dispose the fourth sealing member between the second lens and the lens barrel.

In the at least an embodiment of the present invention, it is preferred that the lens barrel includes a second communication path that connects a second space between the first lens on a radial inside of the second sealing member and the second lens to the outside of the lens barrel. In accordance with this configuration, when the first lens is installed onto the lens barrel, air in the second space between the first lens and the second lens can be evacuated to the outside of the lens barrel, so that assembling the first lens to the lens barrel can be easy.

In the at least an embodiment of the present invention, it is preferred that the second communication path is sealed with a fifth sealing member. In accordance with this configuration, since the second communication path is sealed with the fifth sealing member after the first lens is mounted on the first housing portion, even when the second communication path is provided to evacuate air in the second space to the outside of the lens barrel, the airtightness inside the lens barrel can be enhanced.

In the at least an embodiment of the present invention, it is preferred that the first communication path and the second communication path partially merge to be connected to the outside of the lens barrel, the third sealing member and the fifth sealing member are integrally formed to seal the first communication path and the second communication path, respectively. In accordance with this configuration, since the third sealing member and the fifth sealing member, which seal the first and second communication paths, respectively, can be integrally formed in a single unit, it is possible to make a lens unit assembly simple.

In the at least an embodiment of the present invention, it is preferred that when viewed from an optical axis direction, at least a portion of the first communication path overlaps the first sealing member. This configuration makes it easy to evacuate air in the space between the first sealing member and the second sealing member to the outside of the lens barrel.

In the at least an embodiment of the present invention, it is preferred that the lens unit further includes a light shielding layer provided on the image side surface of the first lens to surround an outer periphery of the image side surface, wherein when viewed from the optical axis direction, the second sealing member overlaps the light shielding layer. In accordance with this configuration, the second sealing member is invisible from the outside due to the light shielding layer.

In the at least an embodiment of the present invention, it is preferred that the lens barrel includes an attaching surface that faces the image side surface of the first lens, and the second sealing member is an adhesive that cements the image side surface of the first lens and the attaching surface. In accordance with this configuration, the second sealing member is capable of not only cementing the image side surface of the first lens and the attaching surface but also sealing a gap between the image side surface of the first lens and the attaching surface.

In the at least an embodiment of the present invention, it is preferred that the attaching surface includes a mounting surface on which the first lens is mounted and a bottom surface located on the image side with respect to the mounting surface. In accordance with this configuration, the first lens can be stably mounted on the mounting surface.

In the at least an embodiment of the present invention, it is preferred that the attaching surface includes an inclined surface that connects the mounting surface and the bottom surface. Here, when the attaching surface has a mounting surface and a bottom surface, a step portion is formed by the mounting surface and the bottom surface. In this case, when the adhesive is applied to the attaching surface, the adhesive is insufficiently applied to the step portion, so that gaps may be formed around the step portion. Accordingly, this configuration makes it possible to sufficiently apply the adhesive to the attaching surface since no step portions are formed. As a result, the airtightness inside the lens barrel can be enhanced.

In the at least an embodiment of the present invention, it is preferred that the attaching surface includes an annular groove recessed toward the image side. In this case, in the at least an embodiment of the present invention, it is preferred that the groove comprises an annular inner-circumference groove and an annular outer-circumference groove extending along a circumference at a radial outside of the inner-circumference groove. In accordance with this configuration, by disposing the adhesive (second sealing member) between the inner-circumference groove and the outer-circumference groove, when the first lens is installed onto the lens barrel, an excessive adhesive between the image side surface of the first lens and the attaching surface can flow into the inner-circumference groove and the outer-circumference groove. As a result, it is possible to regulate an adhesive disposed region to an area on the attaching surface.

Accordingly, in the at least an embodiment of the present invention, the first lens accommodated in the lens barrel is sealed with the first sealing member and the second sealing member, so that a high airtightness inside the lens barrel can be ensured. Furthermore, even if moisture passes through the lens barrel, the moisture is hard to penetrate deep into the lens barrel since the second sealing member seals the gap between the image side surface of the first lens and the attaching surface. Therefore, even after a long-term usage of the lens unit, the moisture is hard to penetrate deep into the lens barrel, so that the lens surface on the image side of the first lens can be prevented from being clouded.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

(a) and (b) of FIG. 2 are diagrams illustrating a lens barrel.

(a) and (b) of FIG. 3 are diagrams illustrating a method of assembling the lens unit.

(a) and (b) of FIG. 4 are diagrams illustrating a method of assembling the lens unit.

(a) and (b) of FIG. 5 are diagrams illustrating a method of assembling the lens unit.

DETAILED DESCRIPTION

Now, at least an embodiment of the present invention is described with reference to the drawings. In the drawings referred to in the following description, the number and scale of each component are depicted so as to be different between the drawings in order to make the size of each component discriminable in the drawing. Furthermore, in the following explanations, La and Lb are defined as an object side and an image side in an optical axis L direction where the optical axis L extends, respectively.

Configuration of the Lens Unit

Figure 1:
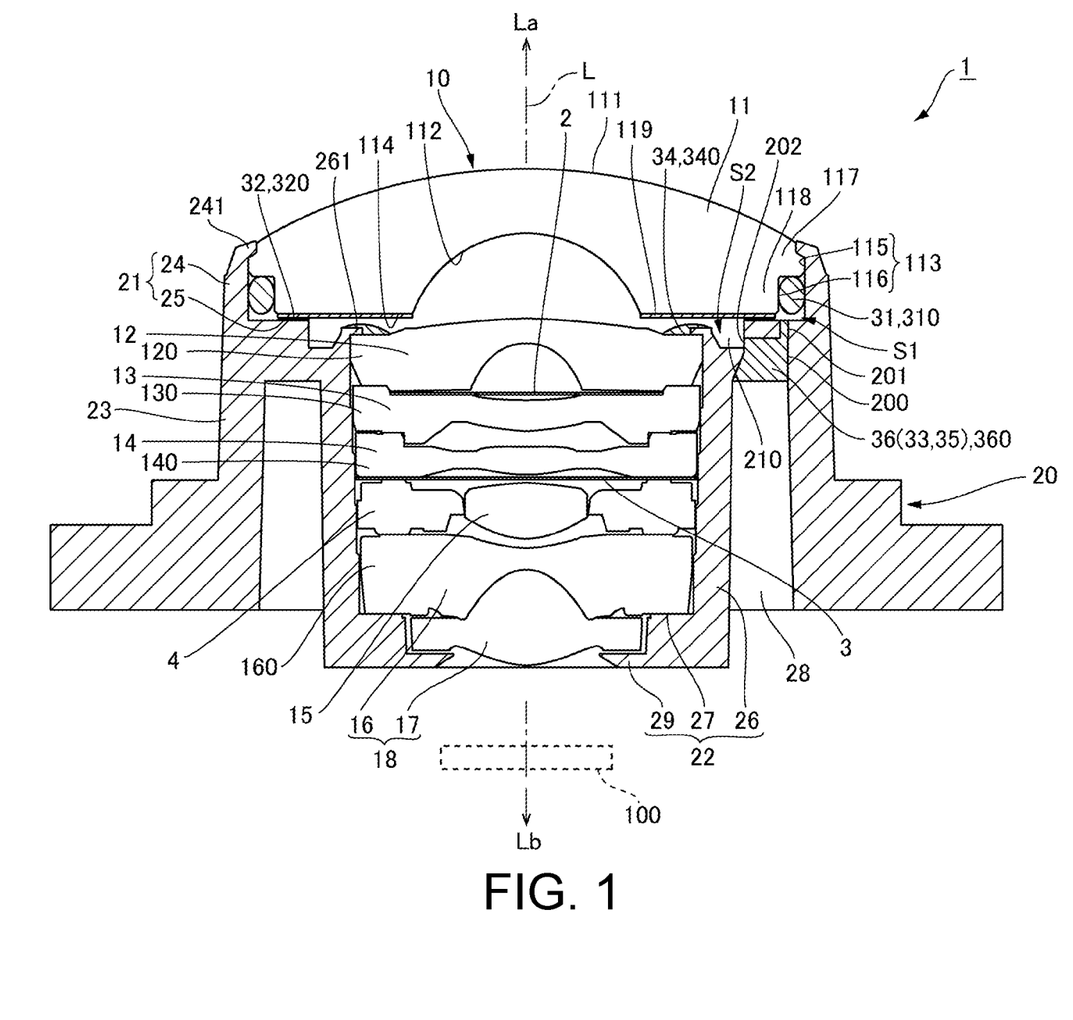
FIG. 1 is a cross-sectional view illustrating a lens unit to which at least an embodiment of the present invention is applied.

FIG. 1 is a cross-sectional view illustrating a lens unit to which at least an embodiment of the present invention is applied. The lens unit 1 of this embodiment is used in an optical device such as an imaging device and the like. The lens unit 1 has a substantial rotation-symmetry configuration around the optical axis L. The lens unit 1 shown in FIG. 1 includes a wide-angle lens 10 having a plurality of lenses arranged in the optical axis L direction and a lens barrel 20 holding the wide-angle lens 10 inside the same. An imaging element 100 is provided on the image side Lb of the lens barrel 20. The imaging element 100 is a CMOS or the like.

Wide-Angle Lens

The wide-angle lens 10 has a six-group seven-lens configuration, for example. In this embodiment, the wide-angle lens 10 has a first lens 11 disposed on the most object side La, and a plurality of image side lenses disposed on the image side Lb from the first lens 11, which includes a second lens 12 facing the first lens 11 on the image side Lb in the optical axis L direction. More specifically, the wide-angle lens 10 includes a first lens 11 having a negative power, a second lens 12 having a negative power, a third lens 13 having a positive or negative power, a fourth lens 14 having a positive power, a fifth lens 15 having a positive power, and a junction lens 18 having a positive power (sixth lens 16 and seventh lens 17) in a direction from the object side La to the image side Lb. The plurality of image side lenses is configured of the second lens 12 through the seventh lens 17.

The first lens is a glass lens or a plastic lens. The first lens 11 is a meniscus lens. A first lens surface 111 of the first lens 11 on the object side La is a convex surface projecting toward the object side La, and a second lens surface 112 of the first lens 11 on the image side Lb is a concave surface recessing toward the object side La. The first lens 11 includes an outer peripheral surface 113, and a flange surface 114 which is a surface of the first lens 11 on the image side Lb. The outer peripheral surface 113 has a first outer peripheral surface 115 at a large-diameter portion 117 and a second outer peripheral surface 116 at a small-diameter portion 118 which is located on the image side Lb from the large-diameter portion 117 and has a smaller diameter than the large-diameter portion 117. The flange surface 114 is located radially outside the second lens surface 112 and oriented toward the image side Lb.

The second lens 12, the third lens 13 and the fourth lens 14 are plastic lenses. The fifth lens 15 is a glass lens. The junction lens 18 is a junction lens in which the sixth lens 16 being a plastic lens having a negative power is cemented to the seventh lens 17 being a plastic lens having a positive power. The lens unit 1 includes an annular light shielding sheet 2 between the second lens 12 and the third lens 13, and an annular aperture 3 between the fourth lens 14 and the fifth lens 15.

An outer diameter of the first lens 11 is larger than that of the second lens 12, the third lens 13, the fourth lens 14, the fifth lens 15, or the junction lens 18. Each of the second lens 12, the third lens 13, the fourth lens 14, and the junction lens 18 in which the sixth lens 16 has a larger outer diameter than the seventh lens 17 is substantially equal in an outer diameter. The outer diameter of the fifth lens 15 is the smallest of the lenses including the second lens 12 and the like.

Figure 2:
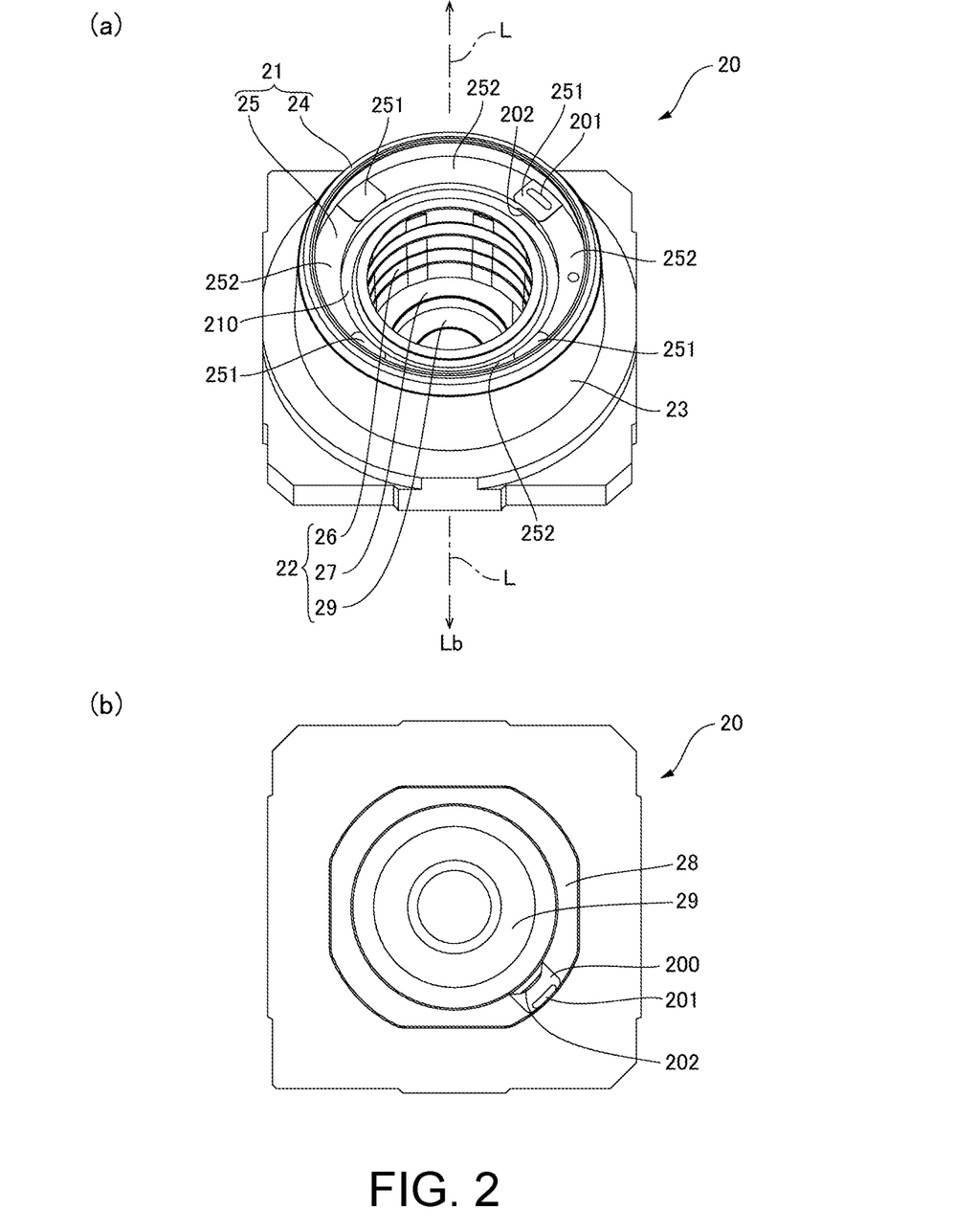

Lens Barrel (a) and (b) of FIG. 2 illustrate the lens barrel 20, wherein (a) of FIG. 2 is a perspective view of the lens barrel 20 and (b) of FIG. 2 is a view of the lens barrel 20 viewed from the image side Lb.

The lens barrel 20 is made of resin. As examples of the material of the lens barrel 20, there are a crystalline plastic (polyethylene, polyamide, polytetrafluoroethylene) having an excellent weather resistance, an amorphous plastic (polycarbonate, etc.) having a relatively low moisture absorption, and the like. The lens barrel 20 has a cylindrical shape. As shown in FIGS. 1 and 2, the lens barrel 20 has a first housing portion 21 which accommodates the first lens, a second housing portion 22 which accommodates the plurality of image side lenses including the second lens 12, and an outer cylindrical portion 23 which extends from the first housing portion 21 toward the image side Lb. An annular trench 28 for thinning a wall thickness of the lens barrel 20 is formed between the outer cylindrical portion 23 and the second housing portion 22.

As shown in FIG. 1 and (a) of FIG. 2, the first housing portion 21 has a first lens holding cylindrical portion 24 surrounding the outer peripheral surface 113 and an attaching surface 25 on which the flange surface 114 is mounted. The first lens holding cylindrical portion 24 has a cylindrical shape. A caulking cover 241 for fixing the first lens 11 is provided at an end portion of the first lens holding cylindrical portion 24 on the object side La. The inner diameter of the first lens holding cylindrical portion 24 is slightly larger than the outer diameter of the first outer peripheral surface 115 of the first lens 11.

As shown in (a) of FIG. 2, the attaching surface 25 is an annular surface provided on an inner circumferential side in the first lens holding cylindrical portion 24. The attaching surface 25 has a mounting surface 251 on which the flange surface 114 is mounted and a bottom surface 252 located on the image side Lb from the mounting surface 251. Four mounting surfaces 251 are provided at equal intervals along an inner circumference.

As shown in FIG. 1 and (a) of FIG. 2, the second housing portion 22 is located inside the first housing portion 21. The second housing portion 22 is provided with a second lens holding cylindrical portion 26 surrounding the outer peripheral surfaces of the plurality of image side lenses including the second lens 12, a step portion 27 extending radially inside the inner peripheral surface of the second lens holding cylindrical portion 26, and an extending portion 29 extending radially inside an end of the second lens holding cylindrical portion 26 on the image side Lb. A caulking cover 261 for fixing the second lens 12 is provided at an end portion of the second lens holding cylindrical portion 26 on the object side La.

As shown in FIG. 1, and (a) and (b) of FIG. 2, in the lens barrel 20, there is provided a first communication path 201 to connect a first space S1 between a first sealing member 31 described below and a second sealing member 32 described below to the outside of the lens barrel 20. As shown in (a) of FIG. 2, the first communication path 201 is a hole which is provided in one of the mounting surfaces 251 on the radial outside thereof. As shown in FIG. 1 and (b) of FIG. 2, the first communication path 201 is connected to the outside of the lens barrel 20 via the trench 28 of the lens barrel 20. The first communication path 201 is sealed by a third sealing member 33 after the lens unit 1 is assembled.

As shown in FIG. 1, and (a) and (b) of FIG. 2, in the lens barrel 20, there is provided a second communication path 202 to connect a second space S2 between a portion of the first lens 11 on the radial inside of the second sealing member 32 and the second lens to the outside of the lens barrel 20. More specifically, as shown in (a) of FIG. 2, the second communication path 202 is a hole formed on a side wall of a groove 210 which is provided radially inside the attaching surface 25. As shown in FIG. 1 and (b) of FIG. 2, the second communication path 202 is connected to the outside of the lens barrel 20 via the trench 28 of the lens barrel 20. In this embodiment, as shown in (a) of FIG. 2, the second communication path 202 is located radially inside the mounting surface 251 in which the first communication path 201 is provided. As shown in FIG. 1 and (b) of FIG. 2, the second communication path 202 partially merges the first communication path 201 in the trench 28 to form a single communication path 200, and the communication path 200 is connected to the outside of the lens barrel 20 via the trench 28. As shown in FIG. 1, the second communication path 202 is sealed by a fifth sealing member 35 after the lens unit 1 is assembled. The third sealing member 33 and the fifth sealing member 35 constitutes a sealing member 36. Namely, the third sealing member 33 and the fifth sealing member 35 are integrated. In this embodiment, the sealing member 36 is a UV curable adhesive 360. In this embodiment, the sealing member 36 is the adhesive 360. The adhesive 360 is a UV curable adhesive.

Fixing of the Wide-Angle Lens

As shown in FIG. 1, the first lens 11 is inserted into the first lens holding cylindrical portion 24. The first lens 11 is restricted from moving toward the object side La by covering the caulking cover 241 from the object side La. As a result, the first lens 11 is held inside the first housing portion 21.

A first sealing member 31 is provided between the second outer peripheral surface 116 of the first lens 11 and the first lens holding cylindrical portion 24. In this embodiment, the first sealing member 31 is an O-ring 310. The O-ring 310 is provided between the second outer peripheral surface 116 of the first lens 11 and the inner peripheral surface of the first lens holding cylindrical portion 24 so as to adhere thereto with being elastically deformed in the radial direction. When viewed from the optical axis L direction, at least a portion of the first communication path 201 overlaps with a portion of the O-ring 310.

As shown in FIG. 1, a second sealing member 32 is provided between the flange surface 114 of the first lens 11 and the attaching surface 25 radially inside the O-ring 310. Namely, the second sealing member 32 is disposed between the flange surface 114 of the first lens 11, and the mounting surface 251 and the bottom surface 252. In this embodiment, the second sealing member 32 is an adhesive 320 which cements the flange surface 114 and the lens barrel 20 radially inside the first sealing member 31. Accordingly, the flange surface 114 of the first lens 11 is cemented to the attaching surface 25 by the adhesive 320. The adhesive 320 is a thermosetting adhesive.

Here, a light shielding layer 119 is provided on the flange surface 114 of the first lens 11 so as to surround the second lens surface 112, when viewed from the optical axis L direction, the second sealing member 32 overlaps the light shielding layer 119. Accordingly, the second sealing member 32 is invisible from the outside. The light shielding layer 119 is a light-shielding coating film applied to the flange surface 114 of the first lens 11.

As shown in FIG. 1, a flange portion 160 of the sixth lens 16 abuts to the step portion 27 from the object side La. The fifth lens is held by the holder 4, and the holder 4 abuts to the flange portion 160 of the sixth lens from the object side La. A flange portion 140 of the fourth lens 14 abuts to the holder 4 from the object side La. A flange portion 130 of the third lens 13 abuts to the flange portion 140 of the fourth lens 14 from the object side La via the aperture 3. A flange portion 120 of the second lens 12 abuts to the flange portion 130 of the third lens 13 from the object side La via the light shielding sheet 2.

The flange portion 120 of the second lens 12 is restricted from moving toward the object side La of the second lens 12 by covering the caulking cover 261 from the object side La. As a result, the second lens 12, the light shielding sheet 2, the third lens 13, the fourth lens 14, the aperture 3, the fifth lens 15, and the junction lens 18 are held inside the second housing portion 22.

As shown in FIG. 1, in this embodiment, a fourth sealing member 34 is provided radially inside the second sealing member 32 in order to seal a gap between the second lens 12 and the lens barrel 20. In this embodiment, the fourth sealing member 34 is provided between the second lens 12 and the caulking cover 261 to seal a gap between the second lens 12 and the caulking cover 261. In this embodiment, the fourth sealing member 34 is an adhesive 340 which cements the second lens 12 and the caulking cover 261. The adhesive 340 is a UV curable adhesive.

Assembly of the Lens Unit

Next, a method of assembling the lens unit 1 is described. (a) and (b) of FIG. 3, (a) and (b) of FIG. 4, and (a) and (b) of FIG. 5 are diagrams illustrating a method of assembling the lens unit 1.

Figure 3:
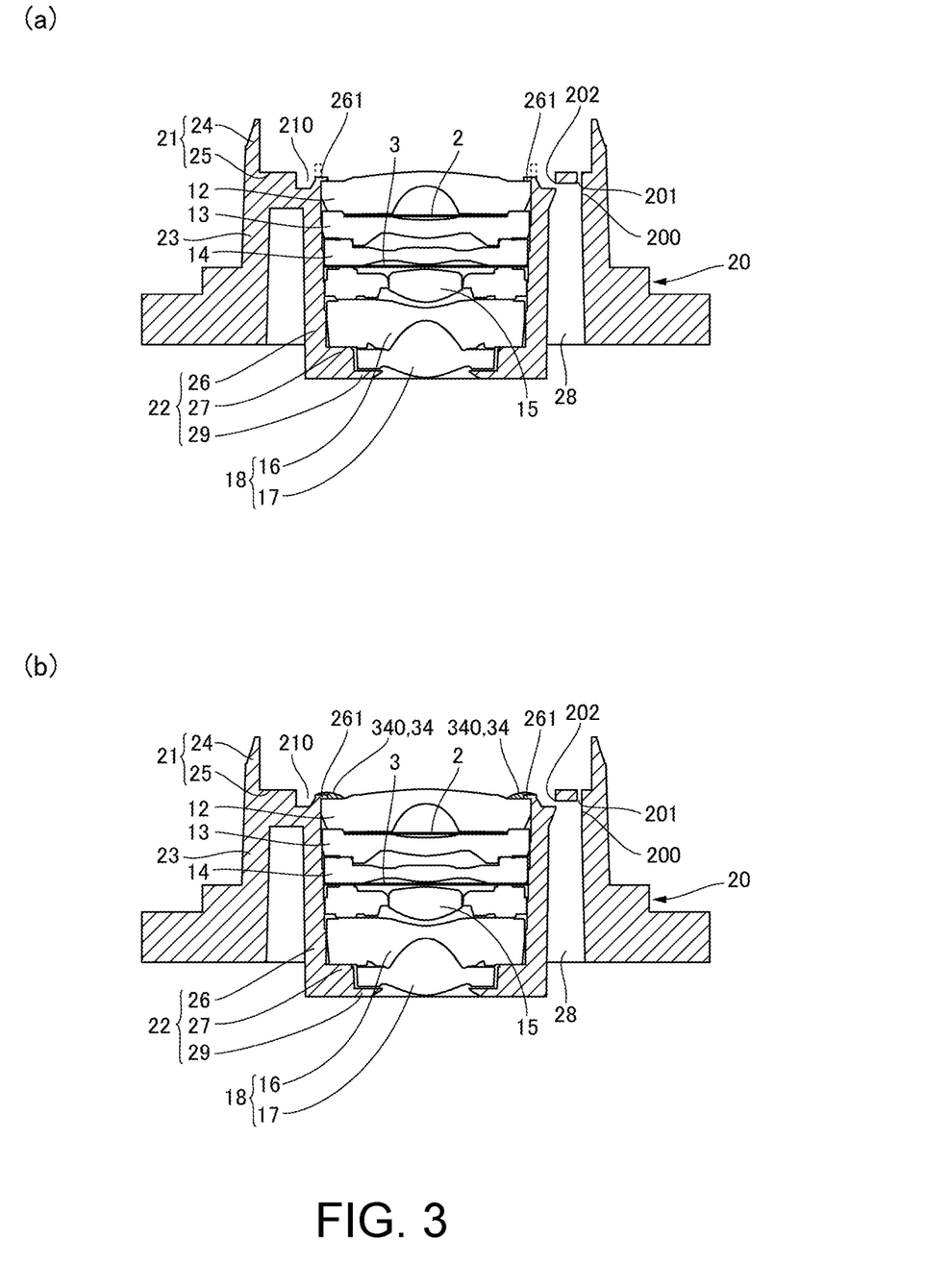

As shown in (a) of FIG. 3, a step of accommodating the second lens 12, the light shielding sheet 2, the third lens 13, the fourth lens 14, the aperture 3, the fifth lens 15, and the junction lens 18 inside the second housing portion 22 in this order is performed, and then a step of forming the caulking cover 261 by thermal caulking is performed. Thereafter, as shown in (b) of FIG. 3, a step of applying the adhesive 340 between the second lens 12 and the caulking cover 261 is performed. After the step of applying, a step of irradiating UV light toward the adhesive 340 and curing the adhesive 340 is performed.

Figure 4:
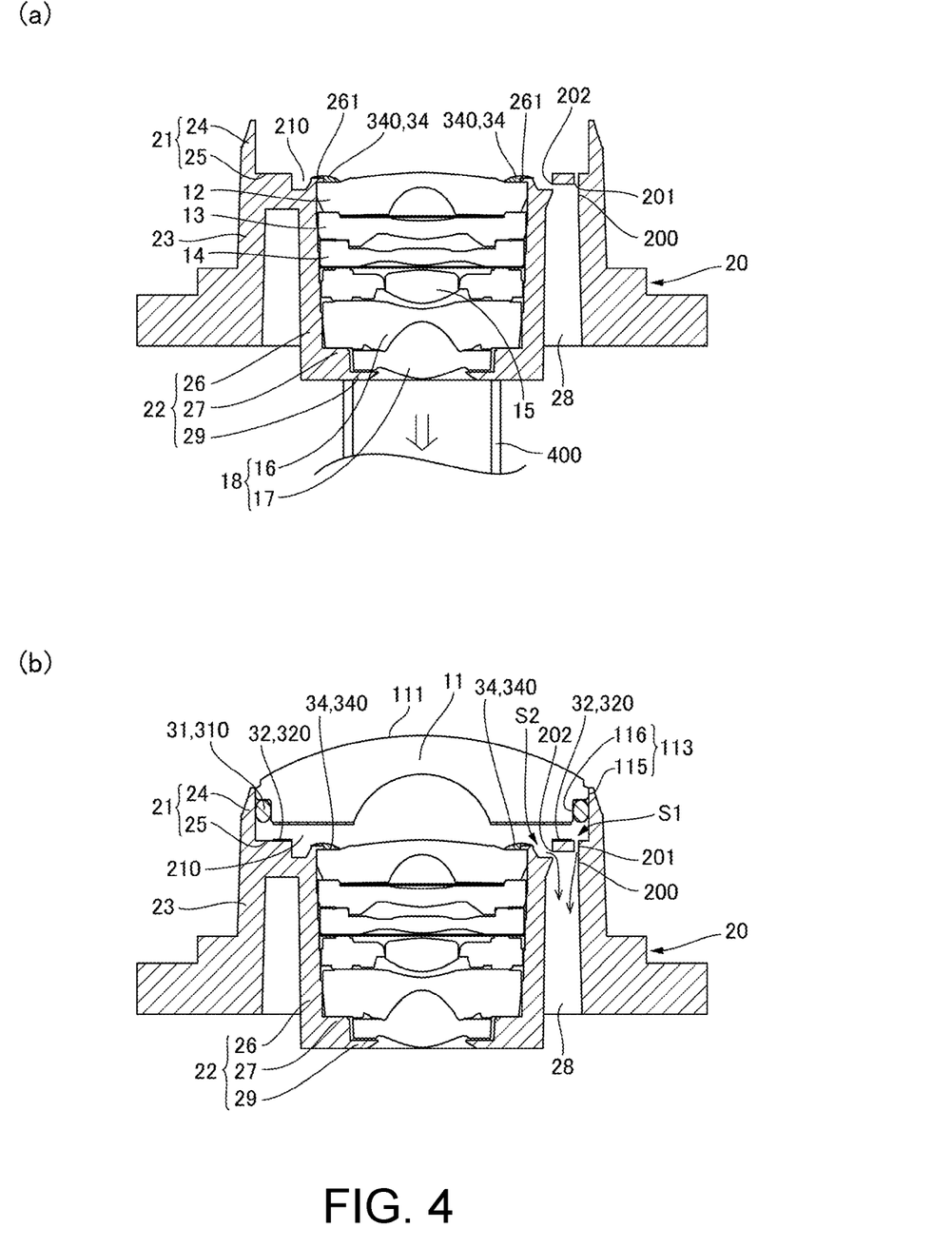
Figure 5:
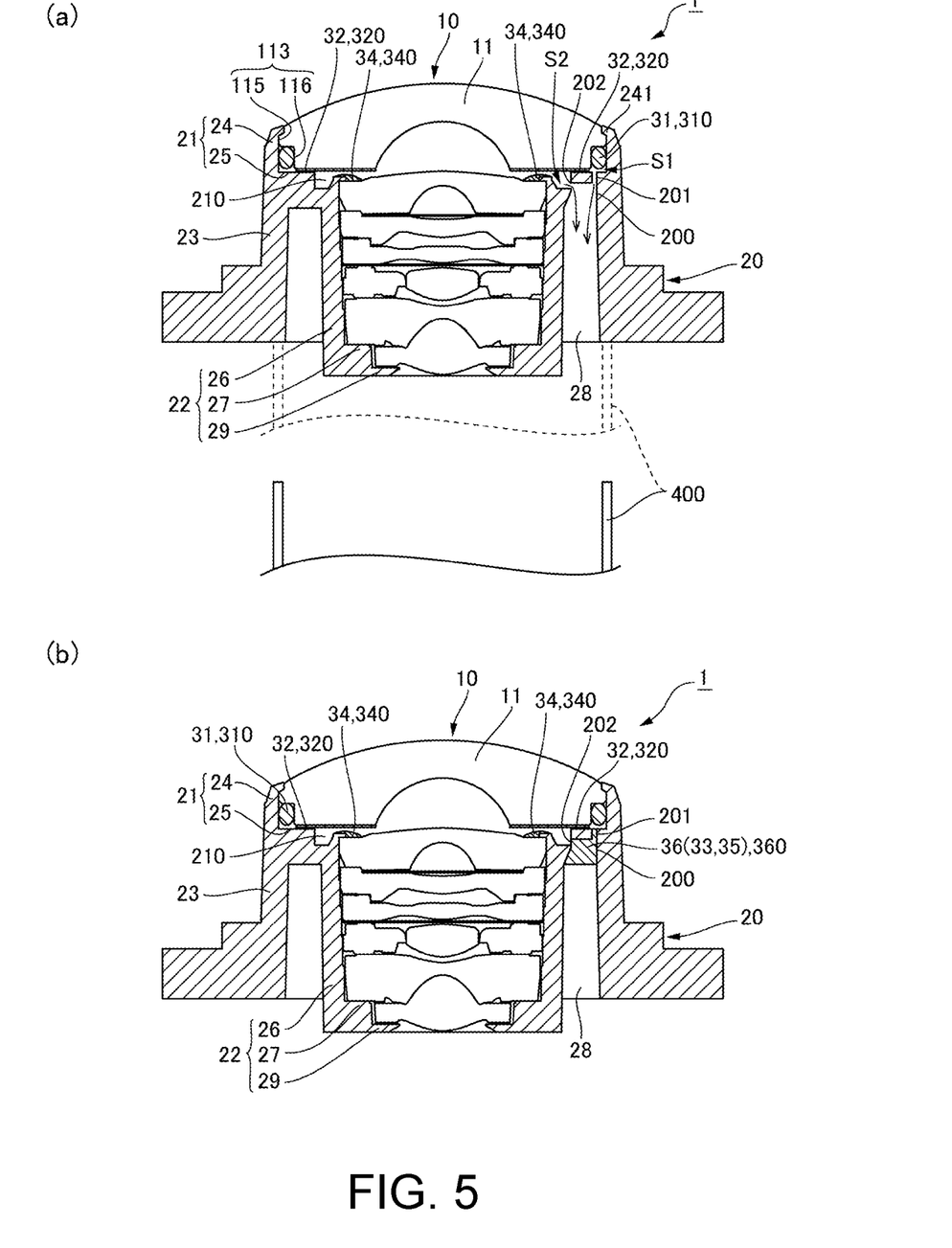

Next, as shown in (a) of FIG. 4, a step connecting an airtightness test machine (e.g., vacuum pump) 400 to the extending portion 29 to depressurize the interior of the second housing portion 22 is performed, and then a step of testing an airtightness of the sealing with the adhesive 340 (leak check) is performed. This allows the airtightness of the second housing portion 22 to be confirmed.

Next, a step of applying the adhesive 320 to the attaching surface 25 is performed. Thereafter, as shown in (b) of FIG. 4, with the O-ring 310 being disposed on the second outer peripheral surface 116 of the first lens 11, a step of inserting the first lens 11 into the first lens holding cylindrical portion 24 is performed. When inserting the first lens 11 into the first lens holding cylindrical portion 24, the O-ring 310 adheres to the second outer peripheral surface 116 of the first lens 11 and the inner peripheral surface of the first lens holding cylindrical portion 24 with being radially elastically deformed, so that air in the first space S1 is not discharged from between the first lens 11 and the first lens holding cylindrical portion 24, but compressed. However, since the first communication path 201 (communication path 200) is provided, air in the first space S1 is discharged from the first communication path 201 (communication path 200) into the trench 28. Similarly, although air in the second space S2 is compressed, since the second communication path 202 (communication path 200) is provided, air in the second space S2 is discharged from the second communication path 202 (communication path 200) into the trench 28. This allows air compressed in the first and second spaces S1 and S2 to be discharged into the trench 28, so that it is possible to prevent the sealing of the adhesive 320 from being broken by the compressed air. In addition, this makes it easy to insert the first lens 11 into the first lens holder cylindrical portion 24.

Next, as shown in (a) of FIG. 5, a step of curing the adhesive 320 by applying heat to the adhesive 320 id performed. At this moment, although air in the first space S1 is expanded with heat, it is discharged from the first communication path 201 (communication path 200) into the trench 28. Similarly, although air in the second space S2 expanded with heat, it is discharged from the second communication path 202 (communication path 200) into the trench 28. This allows air expanded in the first and second spaces S1 and S2 to be discharged into the trench 28, so that it is possible to prevent the sealing of the adhesive 320 from being broken by the expanded air.

Then, a step of testing the airtightness of the O-ring 310 by connecting the airtightness tester 400 to an area including the trench 28 is performed. This allows the airtightness of the first housing portion 21 to be confirmed. If it passes the airtightness test, a step of applying the adhesive 360 to the first and second communication paths 201 and 202 via the trench 28 and the communication path 200 is performed as shown in (b) of FIG. 5. After the step of applying the adhesive 360, a step of irradiating UV light toward the adhesive 360 and curing the adhesive 360 is performed. This allows the first and second communication paths 201 and 202 to be sealed with the adhesive 360.

Main Effects of this Embodiment

As described in the foregoing, a lens unit 1 according to this embodiment including: a first lens 11 disposed on an object side La in an optical axis L direction; a plurality of image-side lenses (second lens 12 through seventh lens 17) including a second lens 12 facing the first lens 11 on an image side Lb in the optical axis L direction and disposed on the image side Lb from the first lens 11; a lens barrel 20 coaxial with the optical axis L to hold the first lens 11 and the plurality of image-side lenses radially inside; a first sealing member 31 to seal a gap between the first lens 11 and the lens barrel 20; and a second sealing member 32 to seal a gap between an image side surface (flange surface 114) of the first lens 11 and the lens barrel 20 radially inside the first sealing member 31.

In accordance with this embodiment, the first lens 11 accommodated in the lens barrel 20 is sealed with the first sealing member 31 and the second sealing member 32, so that a high airtightness inside the lens barrel 20 can be ensured. Furthermore, even if moisture passes through the lens barrel 20, the moisture is hard to penetrate deep into the lens barrel 20 since the second sealing member 32 seals the gap between the flange surface 114 of the first lens 11 and the lens barrel 20. Therefore, even after a long-term usage of the lens unit 1, the moisture is hard to penetrate deep into the lens barrel 20, so that the second lens surface 112 on the image side Lb of the first lens 11 can be prevented from being clouded.

In this embodiment, the lens barrel 20 includes a first communication path 201 that connects a first space S1 between the first sealing member 31 and the second sealing member 32 to an outside of the lens barrel 20. In accordance with this configuration, when the first lens 11 is installed onto the lens barrel 20, air in the first space S1 between the first sealing member 31 and the second sealing member 32 can be evacuated to the outside of the lens barrel 20, so that assembling the first lens 11 to the lens barrel 20 can be easy.

In this embodiment, the first communication path 201 is sealed with a third sealing member 33. In accordance with this configuration, since the first communication path 201 is sealed with the third sealing member 33 after the first lens 11 is mounted on the lens barrel 20, even when the first communication path 201 is provided to evacuate air in the first space S1 to the outside of the lens barrel 20, the airtightness inside the lens barrel 20 can be enhanced.

In this embodiment, the lens unit includes a fourth sealing member 34 that seals a gap between the second lens 12 and the lens barrel 20 radially inside the second sealing member 32. In accordance with this configuration, the airtightness between the second lens 12 and the lens barrel 20 is improved with the fourth sealing member 34, so that moisture from lenses after the second lens 12 in the lens barrel 20 can be prevented from entering between the first lens 11 and the second lens 12. Therefore, it is possible to further suppress the second lens surface 112 on the image side Lb of the first lens 11 from being clouded.

In this embodiment, the lens barrel 20 includes a caulking cover 261 that covers an outer peripheral end of the second lens 12 from the object side. The fourth sealing member 34 is disposed between the second lens 12 and the caulking cover 261. This configuration makes it easy to dispose the fourth sealing member 34 between the second lens 12 and the lens barrel 20.

In this embodiment, the lens barrel 20 includes a second communication path 202 to connect a second space S2 between a portion of the first lens 11 on the radial inside of the second sealing member 32 and the second lens 12 to the outside of the lens barrel 20. In accordance with this configuration, when the first lens 11 is installed onto the lens barrel 20, air in the second space S2 between the first lens 11 and the second lens 12 can be evacuated to the outside of the lens barrel 20, so that assembling the first lens 11 to the lens barrel 20 can be easy.

In this embodiment, the second communication path 202 is sealed with a fifth sealing member 35. In accordance with this configuration, since the second communication path 202 is sealed with the fifth sealing member 35 after the first lens 11 is mounted on the lens barrel 20, even when the second communication path 202 is provided to evacuate air in the second space S2 to the outside of the lens barrel 20, the airtightness inside the lens barrel 20 can be enhanced.

In this embodiment, the first communication path 201 and the second communication path 202 partially merge to be connected to the outside of the lens barrel 20. The third sealing member 33 and the fifth sealing member 35 are integrally formed to seal the first communication path 201 and the second communication path 202, respectively. In accordance with this configuration, since the third sealing member 33 and the fifth sealing member 35, which seal the first communication path 201 and the second communication path 202, respectively, can be integrally formed in a single unit, it is possible to make a lens unit assembly 1 simple.

In this embodiment, when viewed from an optical axis L direction, at least a portion of the first communication path 201 overlaps the first sealing member 31. This configuration makes it easy to evacuate air in the first space S1 between the first sealing member 31 and the second sealing member 32 to the outside of the lens barrel 20.

In this embodiment, a light shielding layer 119 is provided on the image side surface (flange surface 114) of the first lens 11 so as to surround an outer periphery of the second lens surface 112, when viewed from the optical axis L direction, the second sealing member 32 overlaps the light shielding layer 119. In accordance with this configuration, the second sealing member 32 is invisible from the outside due to the light shielding layer 119.

In this embodiment, the lens barrel 20 includes an attaching surface 25 that faces the image side surface (flange surface 114) of the first lens 11, and the second sealing member 32 is an adhesive that cements the image side surface (flange surface 114) of the first lens 11 and the attaching surface 25. In accordance with this configuration, the second sealing member 32 is capable of not only cementing the flange surface 114 of the first lens 11 and the attaching surface 25 but also sealing a gap between the flange surface 114 of the first lens 11 and the attaching surface 25.

In this embodiment, the attaching surface 25 includes a mounting surface 251 on which the first lens 11 is mounted and a bottom surface 252 located on the image side Lb from the mounting surface 251. In accordance with this configuration, the first lens 11 can be stably mounted on the mounting surface 251.

Alternative Embodiment 1 of the Present Invention

Figure 6:
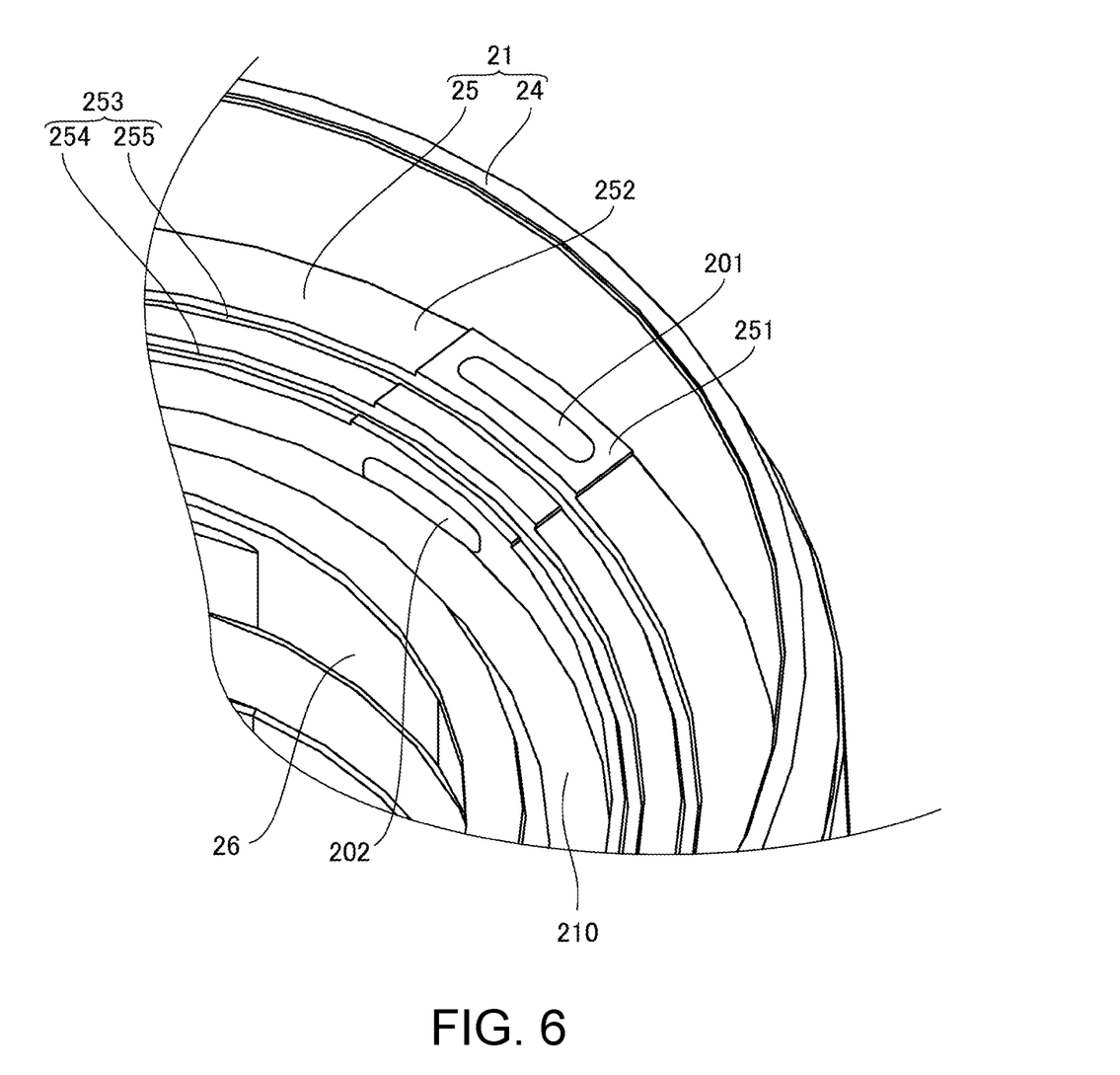
FIG. 6 is a partially enlarged perspective view of a lens barrel according to an alternative embodiment 1.
Figure 7:
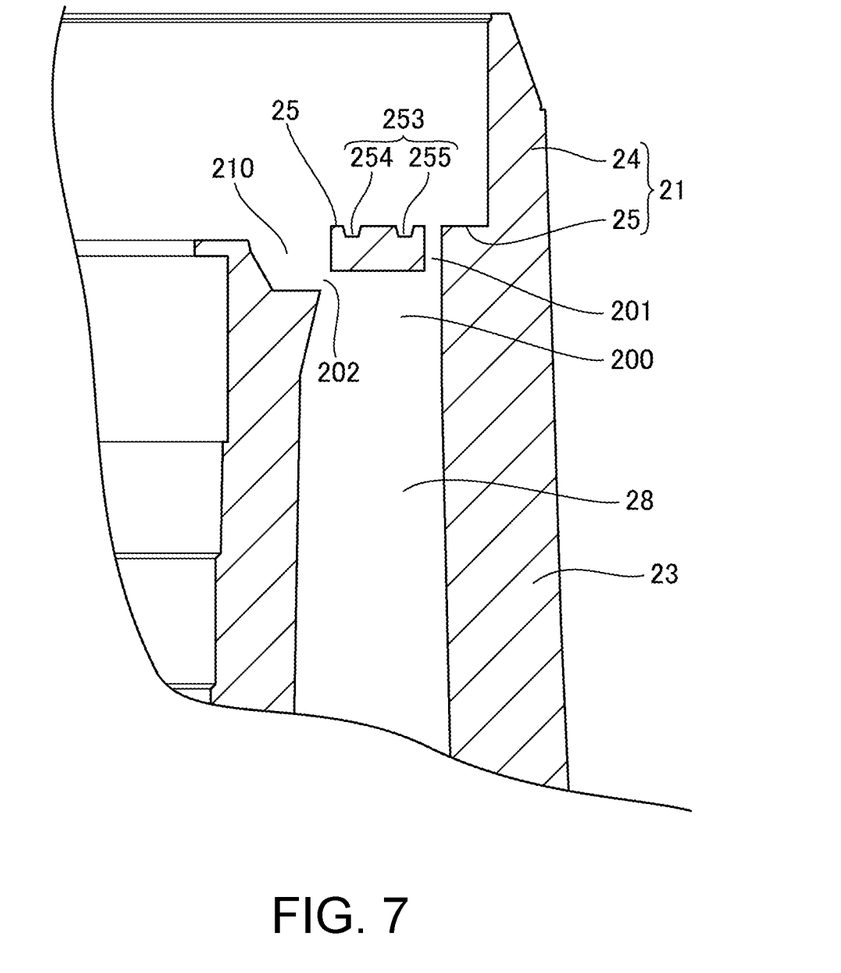
FIG. 7 is a partially enlarged cross-sectional view of an attaching surface according to the alternative embodiment 1.

FIG. 6 is a partially enlarged perspective view of a lens barrel 20 according to an alternative embodiment 1. FIG. 7 is a partially enlarged cross-sectional view of an attaching surface 25 according to the alternative embodiment 1. The lens barrel 20 of the alternative embodiment 1 has the same configuration as that of the above described embodiment except for the configuration of the attaching surface 25 of the lens barrel 20. Accordingly, in the following description of the lens barrel 20 of the alternative embodiment 1, the same components as the lens barrel 20 of the above described embodiment are denoted by identical numbers, respectively, and the description thereof is omitted.

As shown in FIGS. 6 and 7, the attaching surface 25 has an annular groove 253 recessed toward the image side Lb. The groove portion 253 has an annular inner-circumference groove 254 and an annular outer-circumference groove 255 extending along the circumference at the radial outside of the inner-circumference groove 254. In this embodiment, the adhesive 320 is disposed between the inner-circumference groove 254 and the outer-circumference groove 255. When the first lens 11 is installed onto the first housing portion 21, an excessive adhesive between the flange surface 114 of the first lens 11 and the mounting surface 251 flows into the inner-circumference groove 254 and the outer-circumference groove 255. As a result, it is possible to regulate an adhesive disposed region to an area on the mounting surface 251.

Alternative Embodiment 2 of the Present Invention

Figure 8:
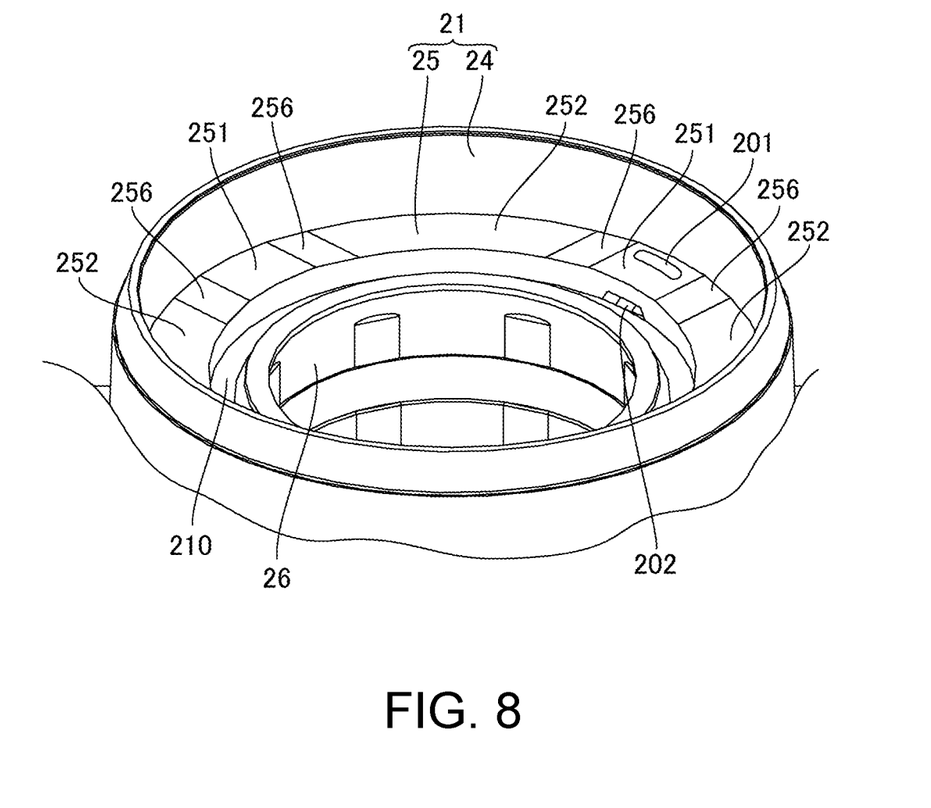
FIG. 8 is a partially enlarged perspective view of a lens barrel according to an alternative embodiment 2.
Figure 9:
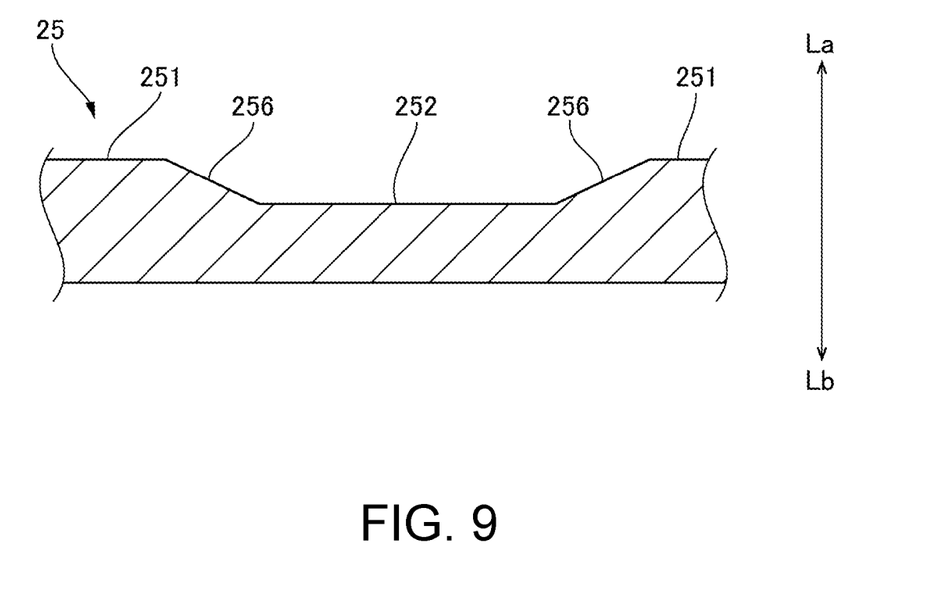
FIG. 9 is a schematic diagram illustrating a partial side view of an attaching surface in the alternative embodiment 2.

FIG. 8 is a partially enlarged perspective view of a lens barrel 20 according to an alternative embodiment 2. FIG. 9 is a schematic diagram illustrating a partial side view of an attaching surface 25 in the alternative embodiment 2. The lens barrel 20 of the alternative embodiment 2 has the same configuration as that of the above described embodiment except for the configuration of the attaching surface 25 of the lens barrel 20. Accordingly, in the following description of the lens barrel 20 of the alternative embodiment 2, the same components as the lens barrel 20 of the above described embodiment are denoted by identical numbers, respectively, and the description thereof is omitted.

As shown in FIGS. 8 and 9, the attaching surface 25 has an inclined surface 256 which connects the mounting surface 251 and the bottom surface 252. Here, when the adhesive 320 is applied to the attaching surface 25 without the inclined surface 256, the adhesive may be insufficiently applied to the step portion formed by the mounting surface 251 and the bottom surface 252, so that gaps may be formed around the step portion. Therefore, by configuring the attaching surface according to this alternative embodiment 2, the mounting surface 251 and the bottom surface 252 are continuously interconnected by the inclined surface 256, so that the adhesive can be applied to the attaching surface 25 without the gaps. Accordingly, the adhesive 320 allows the sealing a gap between the flange surface 114 of the first lens 11 and the attaching surface 25 to be ensured. The groove 253 of the alternative embodiment 1 may be formed in the attaching surface 25 of the alternative embodiment 2.

Another Alternative Embodiment of the Present Invention

Although the first communication path 201 connecting the first space S1 between the first sealing member 31 and the second sealing member 32 to the outside of the lens barrel 20, as well as the second communication path 202 connecting the second space S2 between the first lens 11 and the second lens 12 to the outside of the lens barrel 20 are provided in the above described embodiments, another aspect in which mere the first communication path 201 or mere the second communication path 202 is provided may be employed.

What is claimed is:

1. A lens unit comprising:
a first lens disposed on an object side in an optical axis direction;
a plurality of image-side lenses comprising a second lens facing the first lens on an image side in the optical axis direction and disposed on the image side with respect to the first lens;
a lens barrel holding the first lens and the plurality of image-side lenses radially inside, an optical axis being at a center of a radius;
a first sealing member to seal a gap between the first lens and the lens barrel; and
a second sealing member to seal a gap between an image side surface of the first lens and the lens barrel radially inside the first sealing member, wherein the lens barrel comprises:
a first communication path that connects a first space between the first sealing member and the second sealing member to an outside of the lens barrel; and
a second communication path that connects a second space between the first lens on a radial inside of the second sealing member and the second lens to the outside of the lens barrel;
wherein the first communication path is sealed with a third sealing member;

wherein the lens unit further comprises: a fourth sealing member that seals a gap between the second lens and the lens barrel radially inside the second sealing member.

2. The lens unit according to claim 1, wherein the lens barrel comprises a caulking cover that covers an outer peripheral end of the second lens from the object side, and
the fourth sealing member is disposed between the second lens and the caulking cover.

3. The lens unit according to claim 1, wherein the second communication path is sealed with a fifth sealing member.

4. The lens unit according to claim 3, wherein the first communication path and the second communication path partially merge to be connected to the outside of the lens barrel,
the third sealing member and the fifth sealing member are integrally formed to seal the first communication path and the second communication path, respectively.

5. The lens unit according to claim 1, wherein when viewed from the optical axis direction, at least a portion of the first communication path overlaps the first sealing member.

6. The lens unit according to claim 1 further comprising a light shielding layer provided on the image side surface of the first lens to surround an outer periphery of a lens surface,
wherein when viewed from the optical axis direction, the second sealing member overlaps the light shielding layer.

7. The lens unit according to claim 1, wherein the lens barrel comprises an attaching surface that faces the image side surface of the first lens, and
the second sealing member is an adhesive that cements the image side surface of the first lens and the attaching surface.

8. The lens unit according to claim 7, wherein the attaching surface comprises a mounting surface on which the first lens is mounted and a bottom surface located on the image side with respect to the mounting surface.

9. The lens unit according to claim 8, wherein the attaching surface comprises an inclined surface that connects the mounting surface and the bottom surface.

10. The lens unit according to claim 7, wherein the attaching surface comprises an annular groove recessed toward the image side.

11. The lens unit according to claim 10, wherein the groove comprises an annular inner-circumference groove and an annular outer-circumference groove extending along a circumference at a radial outside of the inner-circumference groove.

\* \* \* \* \*